US006446430B1

United States Patent
Roth et al.

(10) Patent No.: US 6,446,430 B1
(45) Date of Patent: Sep. 10, 2002

(54) SYSTEM FOR REDUCING NOX TRANSIENT EMISSION

(75) Inventors: Stanley A. Roth, Yardley, PA (US); Joseph C. Dettling, Howell; Mahmoud Yassine, Edison, both of NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/944,770

(22) Filed: Sep. 4, 2001

Related U.S. Application Data

(63) Continuation of application No. 09/507,999, filed on Feb. 22, 2000.

(51) Int. Cl.$^7$ ............................................. F01N 3/00
(52) U.S. Cl. ............................ 60/286; 60/295; 60/303
(58) Field of Search .......................... 60/276, 286, 295, 60/297, 301, 303, 300

(56) References Cited

U.S. PATENT DOCUMENTS

| | | | |
|---|---|---|---|
| 4,961,917 A | 10/1990 | Byrne | |
| 5,009,210 A | 4/1991 | Nakagawa et al. | 123/489 |
| 5,437,153 A * | 8/1995 | Takeshima et al. | 60/276 |
| 5,483,795 A * | 1/1996 | Katoh et al. | 60/276 |
| 5,516,497 A | 5/1996 | Speronello et al. | |
| 5,522,218 A | 6/1996 | Lane et al. | |
| 5,524,432 A | 6/1996 | Hansel | |
| 5,609,022 A | 3/1997 | Cho | 60/274 |
| 5,628,186 A | 5/1997 | Schmelz | |
| 5,643,536 A | 7/1997 | Schmelz | |
| 5,746,989 A * | 5/1998 | Murachi et al. | 423/212 R |
| 5,785,937 A | 7/1998 | Neufert et al. | |
| 5,804,155 A | 9/1998 | Farrauto et al. | |
| 5,806,310 A * | 9/1998 | Daidou et al. | 60/274 |
| 5,833,932 A | 11/1998 | Schmetz | |
| 5,842,341 A * | 12/1998 | Kibe | 60/274 |
| 5,845,487 A | 12/1998 | Fraenkle et al. | |
| 5,884,476 A * | 3/1999 | Hirota et al. | 60/278 |
| 5,921,076 A | 7/1999 | Krutzsch et al. | |
| 5,935,530 A | 8/1999 | Langer et al. | |

(List continued on next page.)

FOREIGN PATENT DOCUMENTS

| | | | |
|---|---|---|---|
| EP | 0 434 539 A1 | 6/1991 | ............. F01N/3/28 |
| EP | 0 881 367 A1 | 12/1998 | |
| EP | 0 952 321 A2 | 10/1999 | ........... F02D/41/14 |
| WO | PCT/US 01/04308 | 12/2001 | |

OTHER PUBLICATIONS

SAE Paper No. 952491, entitled: "Catalytic Abatement of $NO_x$ from Diesel Engines: Development of Four Way Catalyst", by Michel Deeba, Jennifer Feeley, & Robert Farrauto (Engelhard Corp.) and Nils Steinbock & Alfred Punke (Engelhard Technologies), Oct. 16–19, 1995, pp. 1–13.

SAE Paper No. 950747, entitled: "Abatement of $NO_x$ from Diesel Engines: Status and Technical Challenges", by Jennifer Feeley, Michel Deeba and Robert Farrauto (Englehard Corp.), Feb.27–Mar. 2, 1995, pp. 1–15.

*Primary Examiner*—Thomas Denion
*Assistant Examiner*—Binh Tran
(74) *Attorney, Agent, or Firm*—Richard A. Negin

(57) ABSTRACT

A catalyst reduction system using diesel fuel as a reductant for vehicles equipped with diesel engines reduces NOx transient emissions produced during acceleration. Impending engine accelerations are sensed to produce metered pulse(s) of fuel oil simultaneously with and preferably in advance of, the NOx transient emission. The fuel pulse is sufficient in quantity to reduce the NOx transient emission when the NOx and HC resulting from the cracked fuel oil are present at spatially equal distances within the reducing catalytic converter. Optionally, the washcoat of the reducing catalyst is formulated to delay the adsorption/desorbtion of one of the gases on the washcoat to assure proper timing of the NOx transient and fuel pulse(s).

9 Claims, 8 Drawing Sheets

U.S. PATENT DOCUMENTS

| | | | |
|---|---|---|---|
| 5,943,857 A | | 8/1999 | Ansell et al. |
| 5,974,791 A | * | 11/1999 | Hirota et al. .................. 60/276 |
| 5,996,338 A | * | 12/1999 | Hirota .......................... 60/285 |
| 6,016,653 A | * | 1/2000 | Glassey et al. ............... 60/274 |
| 6,038,854 A | * | 3/2000 | Penetrante et al. ........... 60/297 |
| 6,079,203 A | * | 6/2000 | Wakamoto .................... 60/274 |
| 6,209,317 B1 | * | 4/2001 | Hirota .......................... 60/297 |
| 6,311,484 B1 | * | 11/2001 | Roth et al. .................... 60/301 |

* cited by examiner

SYSTEM FOR REDUCING NOX TRANSIENT EMISSION

"This patent application is a continuation of application Ser. No. 09/507,999, filed Feb. 22, 2000."

BACKGROUND OF THE INVENTION

This invention is directed to the removal of nitrogen oxides (NOx) from the exhaust gases of internal combustion engines, particularly diesel engines, which operate at combustion conditions with air in large excess of that required for stoichiometric combustion, i.e., lean. It is well known that fuel efficiency improvements in excess of 10% can be achieved in gasoline engines operated at "lean burn" conditions when compared to today's engines which cycle the air to fuel ratio about stoichiometric. Diesel engines, by their nature, operate at lean conditions and achieve 20–30% better fuel economy than stoichiometric gasoline engines.

Unfortunately, the presence of excess air makes the catalytic reduction of nitrogen oxides difficult. Emission regulations impose a limit on the quantity of specific emissions, including NOx, that a vehicle can emit during a specified drive cycle such as an FTP ("federal test procedure") in the United States or an MVEG ("mobile vehicle emission group") in Europe. The regulations are increasingly limiting the amount of nitrogen oxides that can be emitted during the regulated drive cycle.

There are numerous ways known in the art to remove NOx from a waste gas. This invention is directed to a catalytic reduction method for removing NOx. A catalytic reduction method essentially comprises passing the exhaust gas over a catalyst bed in the presence of a reducing gas to convert the NOx into nitrogen. Two types of catalytic reduction are practiced. The first type is non-selective catalyst reduction (NSCR) and the second type is selective catalyst reduction (SCR). This invention relates to hydrocarbon (HC) lean-NOx reaction which can be either NSCR or SCR.

In the selective catalyst reduction method, a reducing agent or reductant is supplied to the exhaust stream and the mixture is then contacted with a catalyst. A common nitrogen oxide reducing agent typically used in industrial processes is urea or ammonia, which despite the number of prior art automotive patents, is not favored for vehicular applications because of the infrastructure required for reductant sale to the public. Additionally, any SCR method using a separate reducing agent requiring separate on-board holding tanks and environmental provisions (such as provisions to keep the tank from freezing) present difficult engineering problems to overcome.

Perhaps one of the more sophisticated approaches to using urea/ammonia system in a mobile application is disclosed in a series of patents which include U.S. Pat. No. 5,833,932 issued Nov. 10, 1998; U.S. Pat. No. 5,785,937, issued Jul. 28, 1998; U.S. Pat. No. 5,643,536, issued Jul. 1, 1997; and U.S. Pat. No. 5,628,186, issued May 13, 1997. While these patents discuss reducing reagents in a general sense, they are clearly limited to urea/ammonia reductants. According to this system, a catalytic converter having composition defined in the '932 patent, has a reducing agent storage capacity per unit length that increases in the direction of gas flow. This allows for positioning of instrumentation along the length of the catalyst as disclosed in the '536 patent to determine the quantity of ammonia stored in the catalyst. The catalyst is thus charged with the reducing agent such that transient emissions can be converted by the reducing agent stored in the catalytic converter. As explained in the '186 patent, should the vehicle experience a sudden increase in load or acceleration, and without having to wait for an increase in the temperature of the catalytic converter, the stored reducing agent is utilized to reduce NOx, thereby preventing overloading of the catalytic converter, i.e., ammonia breakthrough. The ammonia is metered on/off by the length sensors to "charge" the catalyst with stored ammonia. On acceleration, the metering is stopped to prevent ammonia slip (col. 7, '536 patent).

Urea/ammonia SCR systems are characterized in that the catalysts have the ability to store ammonia at temperatures of the exhaust gases, at least at the relatively low operating temperature ranges of exhaust gases produced by diesel engines. Ammonia SCR systems can therefore be developed by catalyst sizing and ammonia slip control techniques (such as described above) to assure a sufficient quantity of ammonia is present to reduce the NOx emissions generated by the engine and particularly the increased NOx emissions produced, transiently, during engine acceleration or engine load increase periods.

Because of the infrastructure limitations of a urea/ammonia SCR system in mobile applications, there is prior art for the use of hydrocarbons (HC) as a selective reducing reagent for NOx emissions. While reducing catalytic converters (principally base metal zeolites, copper or cobalt ZSM-5 for high temperatures) are able to reduce NOx emissions in the presence of HC at relatively high temperatures (300 to 450° C.), they are not able to store and release the HC at the higher temperatures. It is well known that HC can be adsorbed in zeolite based catalysts at temperatures below 200° C. which are then desorbed at temperatures of about 200° C. or higher (see any number of HC trap patents, for example, U.S. Pat. No. 5,804,155 incorporated by reference herein and SAE paper No. 950747 incorporated by reference herein). There is also prior art for use of HC as a non-selective reducing agent or reductant for NOx emissions. The reducing catalytic converters in this case are precious metal based catalysts and more usually platinum zeolites typically based on Pt ZSM-5 which are active for NOx reduction at lower temperatures (180 to 250° C.).

Because normal operating temperatures of diesel engines produce exhaust gas temperatures above 200° C., it is not usually possible to store and release HC as in ammonia systems. This is a fundamental difference between ammonia based SCR systems and HC based reaction systems.

Despite this fundamental distinction, there is a segment of the prior art that teaches HC can be adsorbed and desorbed (stored and released) at temperatures which include a portion of the normal operating range of the diesel engine. This conclusion appears to be based on the observation that zeolite containing catalysts show better NOx reduction conversion percentages than non-zeolite containing catalysts.

In Mercedes-Benz U.S. Pat. No. 5,935,530, issued Aug. 10, 1999, a three stage catalytic converter is disclosed having an intermediate section which is said to store HC when the engine runs at reduced load and release the stored HC when the engine is at load so that the secondary injection of HC would not have to change in synchronization with the changing engine load (col. 6). The known adsorber catalyst is defined to include a precious metal catalyst. The data disclosed in the '530 patent is based on an artificial gas composition heated at various temperatures and to which a fixed propane/propene ratio is added. The data shows, (as noted in the SAE references), that for a given temperature range, propene-propane will achieve a high NOx reduction. However, there is no evidence that transient NOx emissions can be controlled by this catalyst design.

Johnson Matthey U.S. Pat. No. 5,943,857 issued Aug. 31, 1999, is also directed to a storage of HC, but storage occurring below a temperature range of 190° C. and a desorbtion of the stored HC at temperature ranges stated to be at 198° C. to 200° C. The '857 patent shows NOx reduction levels achieved between catalyst with and without zeolites and shows that zeolite containing catalysts have a higher NOx conversion efficiency than non-zeolite containing catalysts. The '857 patent shows "transient" test data but what is plotted is not the transient NOx emissions during a FTP or MVEG cycle. In a FTP or MVEG cycle, transient emissions occurring during acceleration significantly increase NOx ppm. In the '857 patent, a constant gas mixture is reduced at varying exhaust gas temperatures modeling temperature variations in a drive cycle and the NOx conversion results are plotted. The data shows an overall increase in NOx reduction using a zeolite catalyst. Significantly, even with a constant gas composition, the data shows that temperature changes produce NOx spikes. The '857 patent attributes the spikes to the catalyst heating up (col. 4). While the statement is correct, for reasons discussed in the Detailed Description below, the spikes result from differences in the NOx conversion percentages attributed to the changing temperature. A careful reading of the '857 and '530 patents simply show that reduction levels of NOx can be increased with catalysts containing zeolites which is a known adsorber. Neither patent shows the catalyst is able to store HC similar to the ammonia systems to reduce NOx transient emissions during a regulated drive cycle.

Further, while many arrangements use diesel fuel as the HC source, there are segments within the prior art in which the HC is said to comprise short chain hydrocarbon. For example, Daimler-Benz U.S. Pat. No. 5,921,076, issued Jul. 13, 1999 shows a staged arrangement for injecting i) $H_2$, ii) $H_2$ and short chain HC and iii) short chain HC into the exhaust stream as a reductant. Air Products U.S. Pat. No. 5,524,432, issued Jun. 11, 1996 shows methane injection. As late as 1995, assignee's SAE paper No. 950747 recommended low molecular weight HCs with high volatility as the reductant. For reasons which will be discussed below, this invention is limited to long straight chain saturated HCs and unsaturated olefins (of any chain length) which are present in fuel oil or diesel fuel.

It should also be noted that within the diesel fuel SCR prior art a number of arrangements exist for injecting the diesel fuel into the exhaust gas. These include injecting excess fuel into the combustion chamber during the expansion stroke, either through individual injectors or utilization of a common injector rail, and any number of injector designs, including those utilizing pulsation techniques, which dispense fuel oil or diesel fuel into the exhaust gas upstream of the catalytic converter.

There are a number of control schemes or techniques used to control the diesel fuel admitted to the catalyst. For example, Volkswagen's European patent No. EP0881367, dated Dec. 02, 1998, measures residual concentrations of hydrocarbons after the catalytic converter to adjust the reducing fuel oil by a regulating algorithm once certain temperatures have been attained. Similarly, Daimler-Benz U.S. Pat. No. 5,845,487, issued Dec. 8, 1998, uses a nitrogen-oxide sensor after an operating temperature has been achieved to control the system. Unfortunately, applicants have not been able to obtain a commercially acceptable NOx sensor having the response sensitivity needed to control NOx emissions at regulated levels.

Caterpillar U.S. Pat. No. 5,522,218, issued Jun. 4, 1996 illustrates a control methodology typically followed by most HC reducing systems in that certain operating conditions of the engine are mapped and correlated with temperature to perform a mathematical routine, usually by a CPU or the engine's ECU, to determine a quantity of reducing agent which is pulsed metered into the system. Systems which measure engine operating conditions to produce a variable metering of the reductant to the catalyst are generally based upon steady-state engine maps. These systems typically measure or calculate engine speed and/or load, space velocity of the exhaust gas and the exhaust gas and/or catalyst temperature to determine a quantity of NOx produced by the engine and a quantity of HC reductant to be metered into the exhaust gas. Once the operating parameters are known, the quantity of NOx emissions produced and consequently the quantity of HC reductant (amount in addition to HC concentration normally present in exhaust gas) to be metered are known vis-a-vis conventional mapping techniques. (See SAE paper No. 950747 and SAE paper No. 952491.) However, it is well known that transient changes in the operating conditions of the engine, specifically EGR (exhaust gas recirculation) and variable geometry turbocharging (VGT), upon acceleration produce transient NOx emissions which are significant. Those emissions will cause current vehicles to fail future NOx emission standards notwithstanding the fact that such vehicles could meet standards at steady state conditions. In this regard, it must also be noted that response time improvements in microprocessor based control systems have led to improvements in EGR control systems reducing NOx transients. However, the NOx transient is instantaneously formed so a response latency exists in any feedback system. Further, while it is recognized that EGR limits NOx formation by lowering in cylinder oxygen levels, the HC present in EGR systems for diesel engines is limited.

Apart from the prior art segment which erroneously concludes that reducing catalysts can effectively store and release HC reductants at normal engine operating temperatures (discussed at some length above), attempts to account for NOx transient variations in HC reducing systems have been based on temperature sensing systems. Because transient emissions are accompanied by a significant increase in exhaust gas temperatures (see discussion in '857 patent), an early detection of the temperature rise coupled with a reduction of HC added to control NOx may keep the temperature within the NOx temperature reduction window at which SCR zeolite based systems are known to function. While that strategy reduces NOx transient spikes, it must be recognized that the engine instantaneously produces the NOx transient which has flowed through the system before the catalyst temperature has measurably changed. Reference can be had to Toyota's U.S. Pat. No. 5,842,341, issued Dec. 1, 1998, for a discussion of such an approach. The '341 patent discloses a conventional steady state system which measures space velocity and outlet exhaust gas temperature to determine a quantity of fuel oil to be metered to the catalyst. The '341 patent recognizes that transient engine conditions will increase the temperature of the exhaust gas which, in turn, will raise the temperature of the catalytic converter to the point where the temperature "window" at which NOx conversion occurs may be exceeded. To prevent this, exhaust gas temperature is measured upstream and downstream of the catalytic converter and the reductant flow is decreased from the steady-state programmed flow when the upstream gas temperature differential exceeds a set value. By reducing the HC reductant, the exothermic reactions attributed to oxidation of the reactant is reduced and the mass of the catalytic converter will not be heated, at a later time, to as high a temperature as it would be at if the HC reductant were present. The belief is that the NOx temperature window of the reducing catalytic converter will not be exceeded during the engine acceleration and the catalyst will still be able to function. However, there may be insufficient reductant to dispose of the NOx emissions when the HC is reduced. Apart from this, in practice, this strategy will not work under real engine conditions because the temperature increase in the catalyst due to the HC+NOx reaction (or other HC oxidation reactions) lags the flow transient. Therefore, the gas transient has passed through the catalyst before the temperature sensor can call for reduction of the HC flow.

SUMMARY OF THE INVENTION

Accordingly, it is a principal object of the present invention to provide a system which detects the impending occurrence of a transient NOx emission and timely meters a fuel oil reductant sufficient in quantity to substantially react with the transient NOx emissions within the catalytic converter.

This object along with other features of the invention is achieved in a system (method and apparatus) for reducing transient and steady state NOx emissions in the exhaust gases of a vehicle powered by a diesel fueled, internal combustion engine which includes a reducing catalytic converter downstream of the engine having a plurality of channels with a reducing catalyst deposited over a portion of the washcoat surface, the channels having a set cross-sectional area and extending through the catalytic converter from an inlet to an exit thereof. A source of substantially long chain, unbranched hydrocarbons, having a majority of hydrocarbon molecules containing more than ten carbon atoms per molecule in its liquid phase, is in fluid communication with a fuel metering valve for pulsing variably set quantities of the hydrocarbons from the HC source pursuant to a valved pulse command signal. An engine control unit receives a plurality of vehicle sensor signals each of which is indicative of an operating condition of the engine and the sensors include at least a temperature sensor generating a signal indicative of the temperature of the exhaust gases and an acceleration sensor signal indicative of an impending change in speed and/or load of the engine as set by the vehicular operator. The ECU in response to the sensor signals, performs at least a first routine setting a constant pulsed quantity of the hydrocarbons when the engine is operating at steady state conditions sufficient to reduce a portion of the NOx emissions produced at that steady state condition and a second routine activated when the acceleration sensor generates a signal indicative of impending acceleration. The second routine i) calculates a transient quantity of hydrocarbons necessary to reduce the NOx emissions generated during the time the engine is accelerating and ii) generates a valve command signal sufficient to pulse meter the transient quantity of hydrocarbons at a set time prior to the engine producing a transient NOx emission when the washcoat has an acidic pH and after the engine has produced the transient NOx emissions when the washcoat has an alkaline pH whereby a time control strategy correlated to the sizing and composition of the reducing catalytic converter as well as the engine conditions which define temperature and space velocity account for transient emissions produced during acceleration phases of a test drive cycle.

In accordance with another aspect of the invention, the reducing catalytic converter has a metal or cordierite monolith substrate with a catalyst washcoat including an acid zeolite such as ZSM-5 zeolite and a metal whereby the reducing catalytic converter is acidic and the advanced time period at which the transient hydrocarbons are introduced into the reducing catalytic converter extends from a time commencing about two seconds in advance of the generation of NOx transient emissions to a time commencing simultaneously or co-incident with the generation of NOx transient emissions.

In accordance with another aspect of the invention, the acceleration sensor may be either a pedal depression sensor or fuel demand sensor, either of which has an inherent lag or response time associated therewith and the system senses not only acceleration but deceleration with the second routine terminating hydrocarbon metering during the time the vehicle is decelerating in response to an operator set speed command.

In accordance with another aspect of the invention, each passage in the monolith is formed with a plurality of longitudinally skewed adjacent sections which define a tortuous path through which the exhaust gases and hydrocarbons pass as the reducing catalytic converter is traversed from inlet to outlet whereby the HC and NOx reaction is improved for NOx reduction and hydrocarbon slip is minimized.

In accordance with another aspect of the invention, the washcoat composition of the reducing catalytic converter is formulated to produce zones within the catalyst having slightly different alkaline pH compositions to retard or slow the NOx and zones within the catalyst having slightly different acidic pH compositions to retard or slow the HC whereby variations in the traveling time of HC and NOx through the catalyst are caused to occur to better insure simultaneous presence of HC and NOx in the catalyst channels where the reduction reaction can occur.

In accordance with yet another aspect of the invention, different acidic/alkaline zones are formed along the length of each catalyst channel and each catalyst channel is longitudinally skewed to form a tortuous path so that the travel time of the HC and NOx components within each channel is varied to increase the likelihood of simultaneous contact of HC and NOx gases within each channel causing NOx conversion. optimally, the alkaline zones contain alkali, alkaline earth or rare earth metal oxides or carbonates.

In accordance with another aspect of the invention, a method for reducing NOx emissions produced in the exhaust gas of an internal combustion engine in a vehicle operating at stoichiometric ratios in excess of 1.03 including lean burn gasoline engines is provided. The method includes the steps of providing a liquid source of long chain hydrocarbons, at least 50% of which have at least ten carbon atoms per hydrocarbon molecule and a reducing catalytic converter downstream of the engine through which the exhaust gases pass. A set of engine operating parameters is sensed sufficient to determine the space velocity of the exhaust gases and the temperature of the exhaust gases. The method senses an operator inputted command causing an acceleration of the engine, such as by a pedal depression sensor or a fuel demand sensor, and calculates the concentration of transient NOx emissions which is expected to occur when the engine is accelerated to meet the operator acceleration command. Provided the exhaust gas temperature is within a set range, the transient calculation utilizes the current NOx emissions produced as determined by the engine operating parameters and a sensed rate of change of those parameters as determined by the operator inputted command. An additional quantity of hydrocarbons sufficient to reduce the transient NOx emissions produced during the acceleration is pulse metered into the exhaust gases. Importantly, the hydrocarbons are pulsed at a set time in advance of but not later than simultaneously with the time the transient NOx emissions are produced by the engine whereby it is likely that the hydrocarbons and the transient NOx emissions occur at the same time and place in the channels of reducing catalytic converter.

It is a general object of the invention to provide a system for reducing NOx emission produced by an internal combustion engine.

Another general object of the invention is to provide a time advanced, HC active lean-NOx reaction system for reducing NOx transient emissions in vehicles powered by diesel engines.

It is a more specific but general object of the invention to provide an HC active lean-NOx system for reducing transient NOx emissions produced in mobile, internal combustion engine applications operated at excess air in which the reductant is diesel fuel or fuel oil.

Still another object of the invention is to provide an NOx reducing system for diesel engines operated in a mobile environment by means of a hydrocarbon reductant characterized in that the likelihood of hydrocarbon slip occurring during hydrocarbon metering is minimized.

Still yet another object of the invention is to provide a hydrocarbon SCR NOx reduction system for mobile diesel engine applications in which active hydrocarbons are timely metered to reducingly react with NOx transient emissions.

Another object of the invention is to provide a liquid HC active lean-NOx catalyst which significantly extends the reducing operating temperature window by the timely admission of a pulse of reductant sufficient to react with the increased transient NOx emissions whereby excess HC exothermic oxidation reactions that reduce NOx at steady state are not an important criteria.

An important object of the invention is to provide a diesel fuel NOx reduction system which uses a desired washcoat formulation in the reducing catalyst to delay the time one of the gas emissions pass through the catalyst by causing an adsorption/desorption reaction with the washcoat so that fuel pulsing can be timely generated to match NOx transient emissions.

Still yet another distinction of the invention is the utilization of a time advanced active lean-NOx HC reaction system to reduce NOx transient emissions resulting from catalyst "light-off" attributed to HC desorbtion of an HC trap catalyst during engine warm-up.

These and other objects, features and advantages of the present invention will become apparent to those skilled in the art upon reading and understanding the Detailed Description of the Invention set forth below taken in conjunction with the drawings.

BRIEF DESCRIPTION OF THE DRAWINGS

The invention may take form in certain parts and an arrangement of certain parts taken together and in conjunction with the attached drawings which form a part of the invention and wherein.

DETAILED DESCRIPTION OF THE INVENTION

Figure 1:
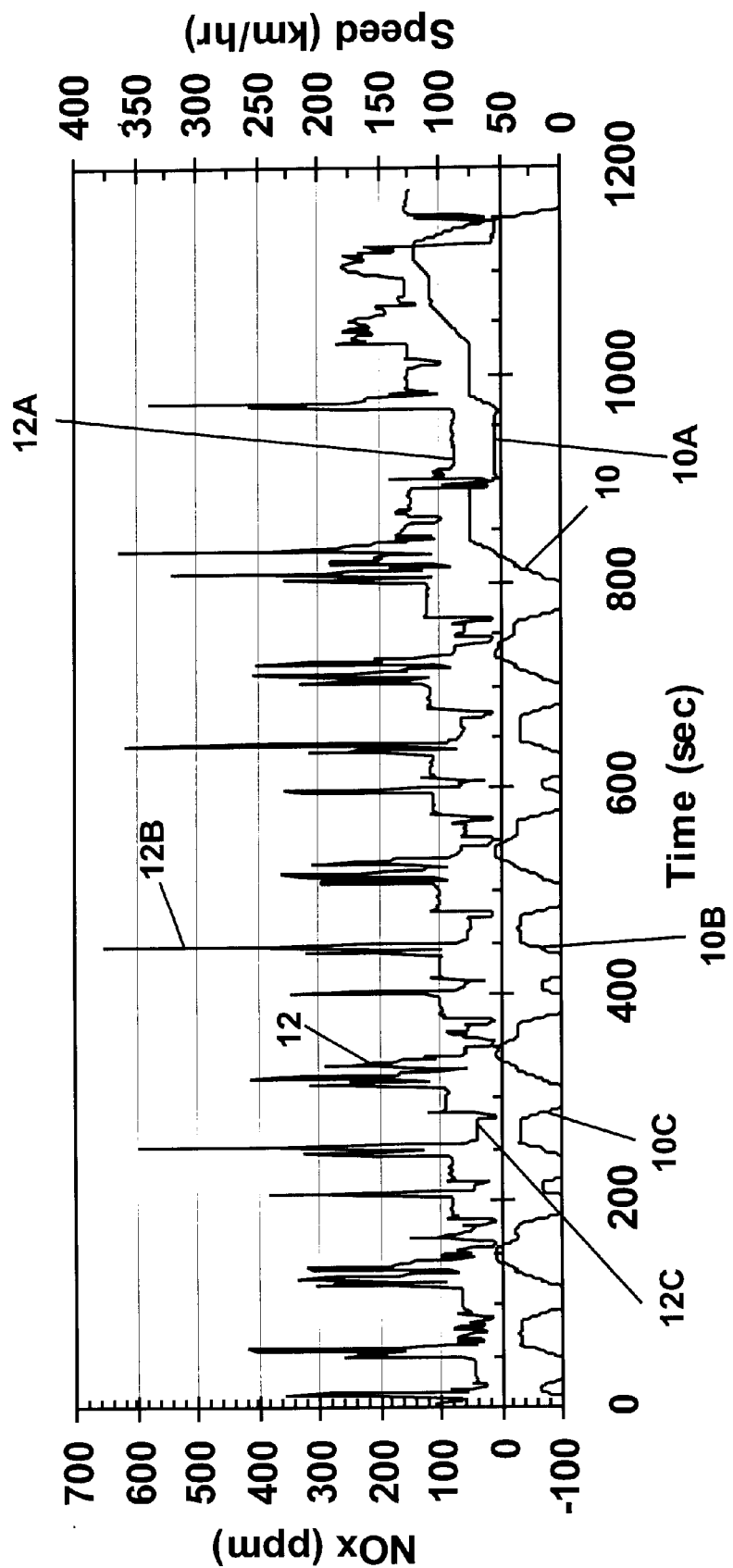
FIG. 1 is a graph of NOx emissions produced in the exhaust gases of a diesel powered vehicle during the European MVEG cycle.

Referring now to the drawings wherein the showings are for the purpose of illustrating a preferred embodiment of the invention only and not for the purpose of limiting same, there is shown in FIG. 1 an MVEG test conducted with a test vehicle equipped with a 1.9 liter turbo-charged, direct injection (TDI) diesel engine. The invention will be described throughout as applicable to a diesel engine, but as indicated above, the invention, in its broader sense, is applicable to gasoline fuel type engines operated lean or with "lean burn" engine fuel strategy.

In FIG. 1, the European MVEG cycle is plotted in seconds on the x-axis with the nitrogen oxides (NOx) emitted by the engine during the drive cycle plotted on the left-hand y-axis and the vehicle speed plotted in km/hr on the right-hand y-axis. The lower trace identified by the reference numeral 10 is a plot of the vehicle speed over the timed portion of the drive cycle. The uppermost plot identified by reference numeral 12 are the NOx emissions produced in the exhaust gases of the engine with the vehicle traveling at the speeds as shown in speed plot 10. The graph shown in FIG. 1 is typical of NOx emissions produced by conventional diesel engines during a regulated drive cycle and is characterized rather dramatically by "spikes" of NOx transient emissions. In marked contrast, laboratory tests where it is possible to achieve 80% NOx conversion efficiencies or higher are typically conducted with propylene at steady state conditions. The transient spikes account for efficiency drops to less than 30% when the laboratory reduction systems are applied to commercial vehicles. Several factual observations concerning the graph of FIG. 1 should be noted as follows:

1) When the vehicle is traveling at a constant speed, the NOx emissions are somewhat constant. This can be shown, for example, by looking at that portion of the vehicle speed plot designated by reference numeral 10A and comparing it to the generally flat portion of NOx emissions generated during that time period in the NOx plot section designated by reference numeral 12A.

2) When the engine accelerates, such as indicated by the acceleration designated as reference numeral 10B, the NOx emissions correspondingly dramatically increase or spike as shown by spike 12B and the spike or pulse or increase in NOx emissions is commonly referred to as an NOx transient. Further, the faster the acceleration or the rate of change, the greater the NOx transient emission.

3) When the engine decelerates, such as at the deceleration designated by reference numeral 10C, the NOx emissions drop and drop below the NOx concentration which occurs at steady state such as indicated by the corresponding NOx emission drop shown by reference numeral 12C.

In general summary, FIG. 1 shows that NOx transient emissions comprise a significant portion of the NOx emissions emitted by a diesel engine during a regulated drive cycle. Also, as a matter of definition, the term "acceleration" when used herein and in the claims is not limited to merely rate changes in the engine rpm but also includes increases in engine load whether or not accompanied by changes in engine speed. As is well known, a load increase on the engine at constant speed, such as when a truck travels up a hill at constant speed, will cause an NOx transient. NOx transients caused by load changes, per se, fall within "acceleration" as used herein. It is appreciated that NOx transient emissions are caused by changes in operating parameters of the total engine "system" such as for example by a change in EGR flow or composition or actuation of a turbo charger. Those changes typically are associated with speed/load changes of the engine. Thus, sensing an acceleration command, as provided for in this invention, accounts for NOx transients caused, by the engine "system" components.

As explained in some detail in the SAE papers incorporated by reference herein, the NOx reduction reaction in the presence of HC proceeds in accordance with equation No. 1.

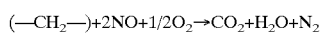

and/or

  Equation No. 1

The hydrocarbon to NOx ratio ($C_1$/NOx) must be approximately 0.5 to meet the stoichiometric requirements for the NOx reduction reaction shown in equation 1. Diesel exhausts typically have lower instantaneous $C_1$/NOx ratios than this during NOx transient emissions and thus, additional fuel, i.e., on-board diesel fuel or drive fuel, must be supplied. However, the selectivity of the catalyst and the speed of the reduction reaction, is somewhat limited. Significantly, the excess air present in the diesel exhaust gases cause competing exothermic oxidation reactions with the HC proceeding in accordance with equation No. 2.

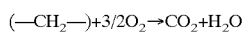  Equation No. 2

Figure 3:
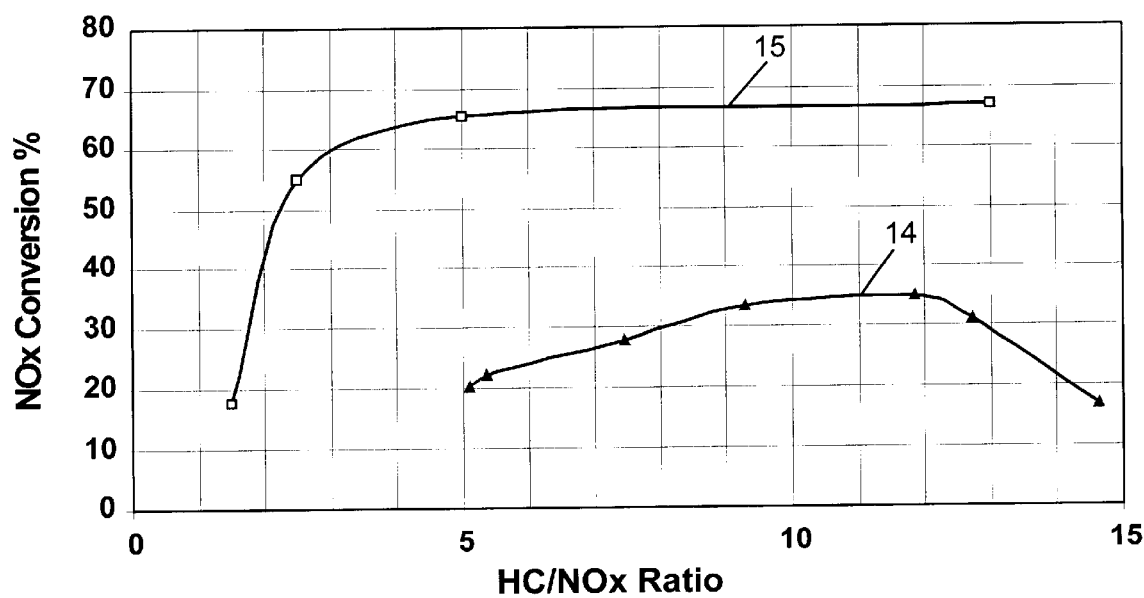
FIG. 3 is a graph plotting NOx conversion percentages as a function of the hydrocarbon to NOx ratio.

In practice, because of competition between NOx and oxygen for the added HC and other considerations, significantly larger quantities of HC producing HC/NOx ratios more than 0.5 are required to produce desired conversion percentages of reduced NOx. Reference should be had to FIG. 3 which plots the HC/NOx ratios for producing various NOx conversion percentages for diesel exhaust gases at various catalytic converter inlet temperatures. More specifically, the trace plotted through triangles identified by reference numeral 14 was produced with diesel exhaust gases at a catalytic inlet temperature of 210° C. The trace passing through squares indicted by reference numeral 15 was generated from diesel gas passing through the catalyst at a catalyst inlet temperature of 250° C. Gas temperatures between 210–250° C. would produce HC/NOx ratio traces falling between curves 14 and 15. The reducing catalyst used when the FIG. 3 curves were generated was a zeolite based catalyst defined by this invention.

Figure 2:
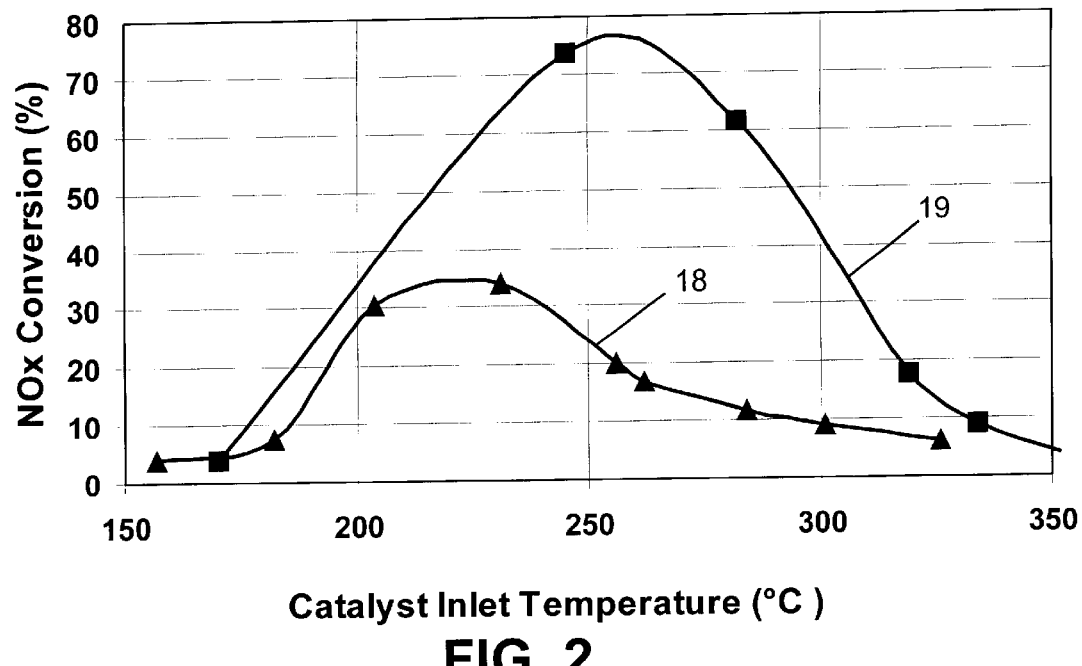
FIG. 2 is a graph of two traces showing NOx conversion percentages as a function of i) catalyst inlet transient temperature for an active HC lean-NOx system and ii) catalyst inlet steady state temperature for a passive NOx System.

Referring now to FIG. 2, there is shown two plots of NOx conversion percentages possible with HC reductant added at desired HC/NOx ratios (i.e., FIG. 3) for diesel exhaust gases at various catalyst inlet temperatures. The trace passing through triangles and identified by reference numeral 18 is a plot of steady state gas inlet temperatures and clearly shows that there is a temperature window within which NOx conversion of exhaust gases are reduced when the exhaust gases pass over a zeolite based catalyst. If gas inlet temperatures fall outside the window, little if any HC reduction of NOx is possible. Again, trace 18 is based on steady state conditions and resembles graphs shown in U.S. Pat. No. 5,943,857 to Ansell et al. and U.S. Pat. No. 5,935,530 to Langer et al. discussed at some length in the Background. In contrast to trace 18, the trace indicated by reference numeral 19 and passing through squares is a plot of exhaust gases containing NOx transient emissions. That is, into exhaust gases of constant composition at a constant temperature, a pulse of NOx gas was injected and the NOx conversion percentage for that NOx transient was determined. In marked contrast to the steady state temperature window of trace 18, the transient temperature window of trace 19 is significantly wider (greater temperature range) and higher (greater NOx conversion range). Trace 19 forms an important underpinning of the present invention for several reasons. First, it is possible to convert and significantly convert, transient emissions even if the temperature of the exhaust gas is outside the steady state catalyst operating, temperature window. Second, the "map" for transient NOx emissions cannot follow the steady state map conventionally used for NOx control. That is, the HC injection pulse is to be followed from a transient pulse map as explained further below. As is well known, conventional techniques measure engine speed (and load) and fueling to determine NOx emissions emitted by the engine. The space velocity (speed of exhaust gases through catalyst) and temperature of the catalyst are then sensed to generate a secondary hydrocarbon injection demand to set the HC injection. Trace 19 shows that the temperature for the active lean NOx can extend significantly further with a higher conversion ratio for transient NOx emissions than possible for steady state emissions. As applied to the present invention, injection of diesel fuel occurs when the reducing catalyst is within a temperature window. That temperature window is at one range when steady state engine operation occurs and at a second range when NOx transient emissions occur.

Figure 5:
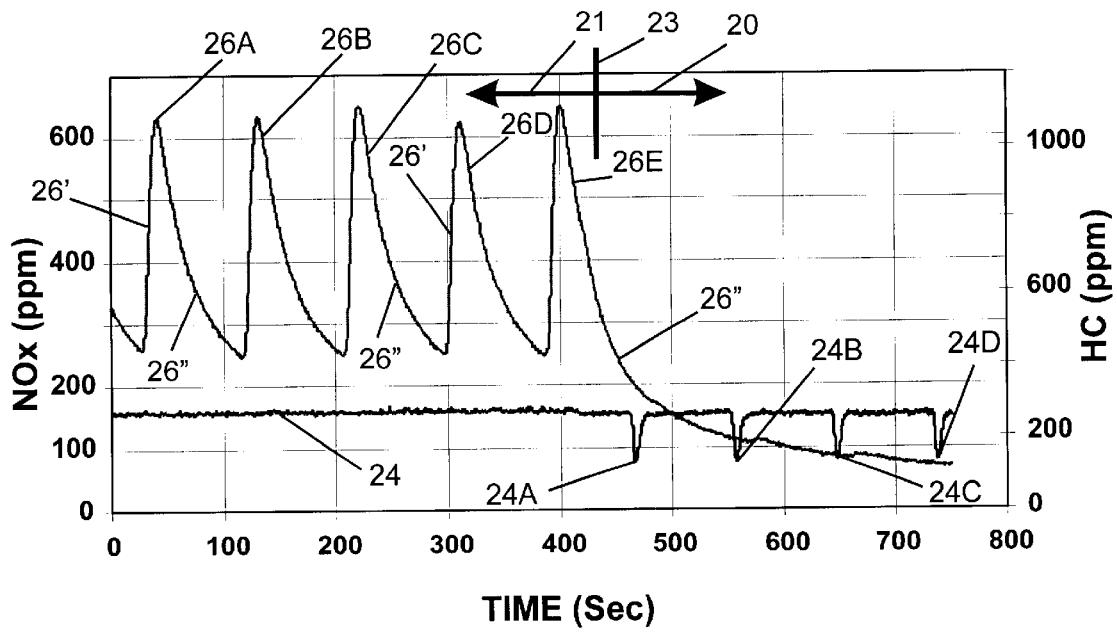
FIG. 5 is a graph showing NOx ppm reductions when pulses of HC are periodically injected into an exhaust gas having a steady state NOx concentration state level.

Referring next to FIG. 5, there is shown the effects of pulsing at timed intervals set quantities of hydrocarbons into a 250° C. exhaust gas containing a steady state or constant concentration of NOx emissions. Unless otherwise indicated, the data and graphs discussed herein were generated with exhaust gases produced from a 2.5 liter TDI diesel engine running at contact speed of about 2000 rpm.

The pulses or transients were generated with a Melt-Ranger Timer made by Automatic Timing Controls Co. This controlled the width, timing and injection period of the pulse. A metering pump was used to inject HC from a diesel fuel tank. The NOx spikes as transients were generated from a 2% cylinder of NOx with balance $N_2$. The HC injection was about 2' in front of catalytic converter inlet and NOx transient was about 40" in front of the catalyst. The pulse widths were about 2 seconds. The catalytic converter was a conventional, platinum exchanged ZSM-5 zeolite based catalyst applied over a metal monolith substrates formed in a honeycomb pattern.

Figure 6A:
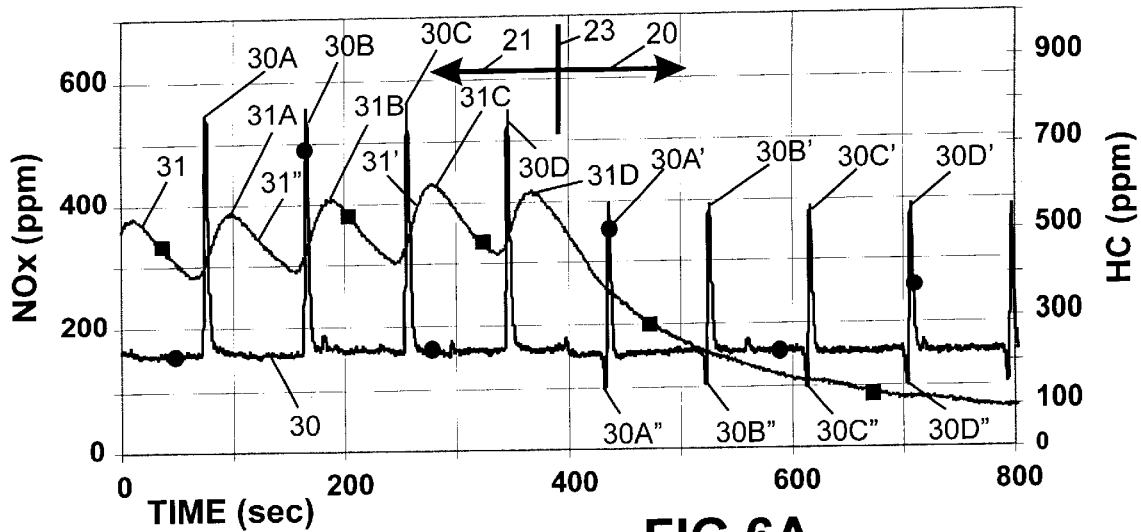
FIGS. 6a, 6b and 6c are graphs similar to FIG. 5 but periodically pulsing concentrations of HC at various times relative to the pulses of NOx, i.e., transients.
Figure 6B:
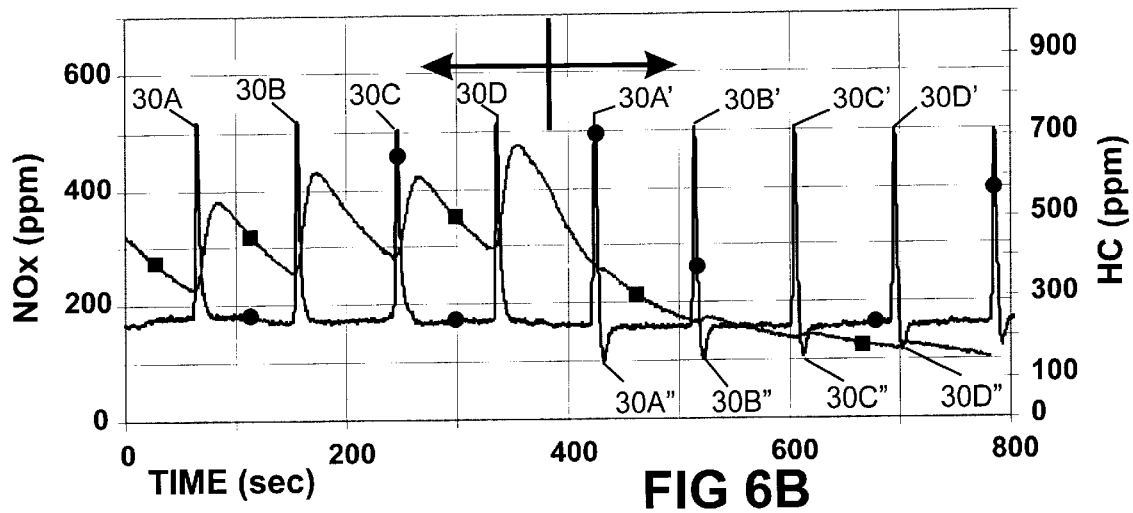
Figure 6C:
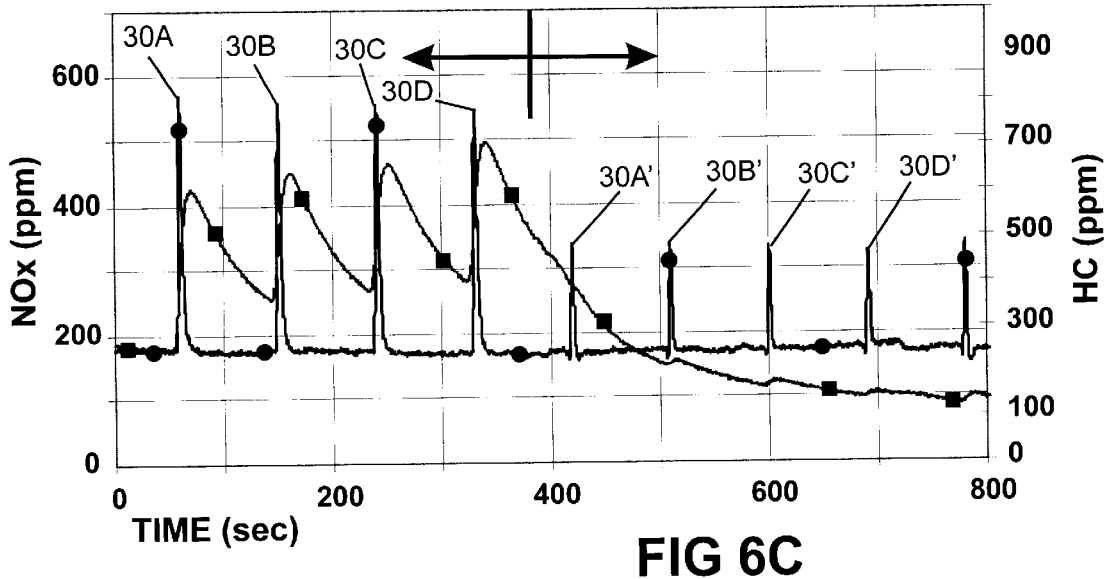

Some explanation must be given for what is portrayed in FIG. 5 which explanation will likewise apply to discussion of FIGS. 6a, 6b and 6c. The time scale plotted on the x-axis of FIG. 5 is relative and is to be read in conjunction with right-hand facing arrow designated by reference numeral 20 and left-hand arrow designated by reference numeral 21 appearing at the top of FIG. 5. Right-hand and left-hand arrows 20, 21 are bisected by a dividing line 23 which represents the reducing catalytic converter. That portion of the graph extending from dividing line 23 in the direction of left-hand arrow 21 indicates the gas conditions in front of the reducing catalytic converter and that portion of the graph extending from dividing line 23 in the direction of right-hand arrow 20 indicates the condition of the exhaust gas at the outlet of the reducing catalytic converter. The NOx concentration in the exhaust gas is indicated by the lower trace designated by reference numeral 24 and as shown, is fairly constant over that portion of the trace covered by left hand arrow 21. The NOx concentration is shown on the left-hand y-axis. The upper trace (extending over the left-hand portion of FIG. 5) designated by reference numeral 26 are hydrocarbons (diesel fuel) pulsed at periodic intervals to the exhaust gas containing the steady concentration of NOx. In the trace shown in FIG. 5, there are five pulses designated 26A, 26B, 26C, 26D and 26E. The injection or the pulse of HC occurs at the leading edge 26' of each pulse trace. The long trailing edge of each pulse trace shown as 26" in reality does not exist. It is an artifact attributed to the HC sampling system. (All pulses were injected over a 2 second time period.) Note, that for each HC pulse (26A–26E) injected into the gas stream upstream of catalytic converter, i.e., 23, there is produced downstream of the reducing catalytic converter, a corresponding NOx reducing pulse respectively identified by reference numerals 24A, 24B, 24C, 24D, etc. FIG. 5 shows that it is possible to generate transient HC pulses which produce corresponding transient NOx reduction pulses which temporarily reduce the concentration of NOx emissions in the exhaust gas. FIG. 5 shows the HC reductant is not adsorbed into the washcoat such as occurs with ammonia SCR systems and is completely removed by the reactions of equations 1 and 2.

Referring now to 6a, there is shown a graph similar to that described in FIG. 5 in that a reducing catalytic converter is represented by dividing line 23 with the conditions upstream of the reducing catalytic converter covered by that portion of the graph extending in the direction of left-hand arrow 21 and the conditions of the gas concentrations downstream of reducing catalytic converter 23 covered by that portion of the graph extending in the direction of right-hand arrow 20. In the graph shown in FIG. 6a, the exhaust gas has a fairly constant concentration of NOx emissions designated by the trace passing through circles and indicated by reference numeral 30 except that periodically, a pulse of additional NOx emissions is caused to occur. This NOx transient emission spike is designated by reference numerals 30A, 30B, 30C and 30D in FIG. 6a. As in FIG. 5, pulses of HC indicated by the trace passing through rectangles and designated as reference numeral 31 are also periodically injected into the gas stream. As explained with reference to FIG. 5, the leading edge of each HC pulse designated by reference numeral 31' is indicative of the time during which the HC is injected into the gas stream and the trailing edge of each HC pulse designated by reference numeral 31" is a sampling artifact to be ignored. In FIG. 6a, there are four HC pulses designated 31A, 31B, 31C and 31D which are timed to be injected into the gas stream four seconds before the NOx transient pulses 30A–30D have been injected. It can be seen that the NOx transient emissions downstream of reducing catalytic converter 23 have been reduced relative to the transient NOx emissions injected into the gas stream upstream of reducing catalytic converter 23. That is, the peak of the downstream NOx transient designated by reference numerals 30A', 30B', 30C' and 30D' have been reduced relative to the peaks of the upstream NOx transients 30A, 30B, 30C and 30D respectively. It should also be noted that each NOx transient spike emission downstream of the catalytic converter has a reducing "dip" designated by reference numerals 30A", 30B", 30C" and 30D" which leads or occurs earlier than NOx spike 30A', 30B', 30C' and 30D'. This indicates that the HC was injected early because a portion of the HC pulse was reacting with the steady state concentration of NOx emissions before the NOx transient emissions arrived in the reducing catalyst.

Referring now to FIG. 6b, a similar test to that conducted and explained with reference to FIG. 6a is shown but in this test, the HC pulsed injection occurred 4 seconds after the NOx transient pulses were induced. The same reference numerals used in describing the test results depicted in graph form in FIG. 6a will be likewise used in describing the test results depicted in graph form for FIG. 6b. FIG. 6b shows that the NOx transient emissions occurring downstream of reducing catalytic converter 23 (i.e., 30A', 30B', 30C' and 30D') are for all intents and purposes, the same transient emissions induced in the exhaust gases upstream of catalytic converter 23, i.e., 30A, 30B, 30C and 30D. Note that the reducing dips 30A", 30B", 30C" and 30D" are occurring after the transient spikes 30A'–30D' and are the same dips shown for FIG. 5. FIG. 6b shows that if the HC is injected at a time period which is very late or after the NOx transient has occurred, the NOx transient will not be affected. FIG. 6b also shows that HC is not stored in the washcoat, at least at the operating temperatures of the engine.

Referring now to FIG. 6c, there is shown graphically, the results of yet another test identical to that described for FIGS. 6a and 6b except that the HC pulses were timed to occur two seconds prior to the NOx injected pulse. Reference numerals used in FIGS. 6a and 6b for describing the test results will likewise be used with respect to FIG. 6c. It is rather dramatically shown that the NOx transient spikes 30A', 30B', 30C' and 30D' occurring at the outlet of reducing catalytic converter are significantly reduced when compared to the upstream NOx transient spikes 30A–30D. Note, there are little if any NOx reducing dips in the NOx emissions downstream of the reducing catalytic converter even though the HC pulses were injected two seconds prior to the injections of the NOx transient pulses.

Again, it should be noted when considering FIGS. 5, 6a, 6b and 6c, that the HC pulses do not significantly affect the NOx concentrations relative to the steady state conditions, i.e., reference numeral 24 in FIG. 5. This shows there is little adsorption occurring within the catalytic converter at 250° C. diesel operating exhaust gas temperatures of this experiment.

Figure 4:
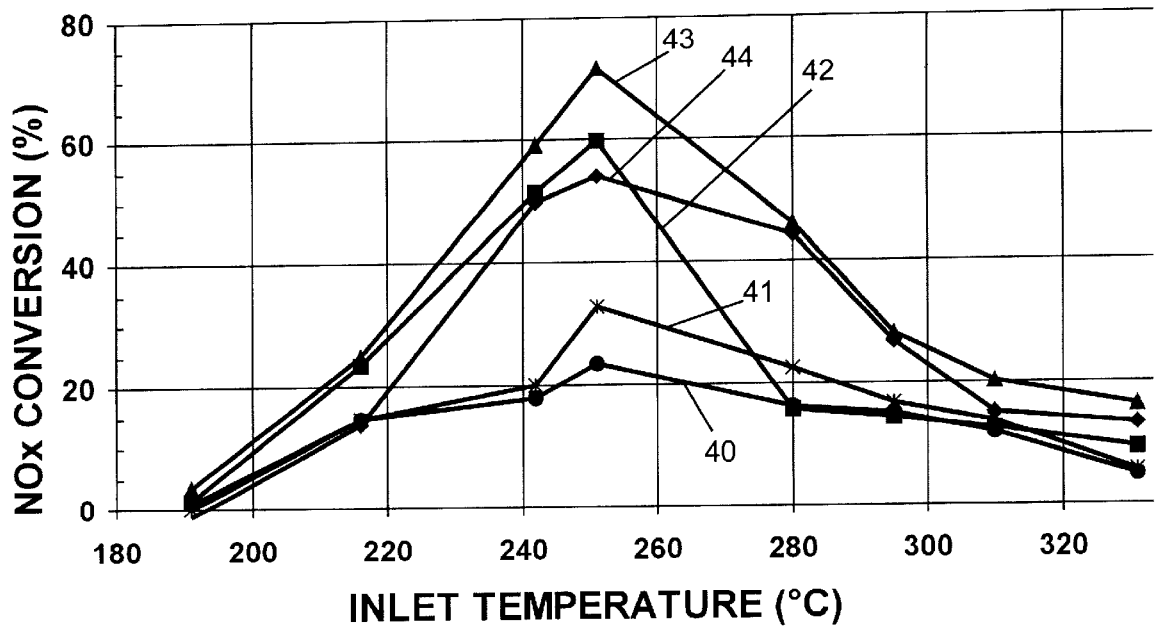
FIG. 4 is a graph of NOx conversion percentages plotted as a function of catalyst inlet temperature for several traces which vary the time at which hydrocarbons are introduced into the inlet of the reducing catalytic converter relative to the time that NOx emissions are introduced into the inlet of the catalytic converter.

The methodology explained with reference to FIGS. 6a, 6b and 6c was repeated in a series of tests with the exhaust gases at various temperatures and HC pulsing occurring at various time intervals relative to the timing of the NOx transient induced pulse. Test results are plotted in FIG. 4. In FIG. 4, the inlet temperature of the exhaust gases is plotted on the x-axis and the NOx conversion percentage is plotted on the y-axis for a series of HC injection pulses timed relative to the NOx transient injection pulse. More specifically, the trace passing through circles and indicated by reference numeral 40 occurred when injecting the HC pulses four seconds after the NOx transient spike was caused to occur. The trace passing through stars and indicated by reference numeral 41 was generated by causing the HC pulses to occur two seconds after the NOx transient emission spikes occurred. The trace passing through diamonds and indicated by reference numeral 42 was generated by injecting the HC pulses simultaneously with the generation of the NOx transient spiked emission. The trace passing through triangles and designated by reference numeral 43 was generated by injecting the HC pulses two seconds prior to the time the NOx transient spikes were generated. Finally, the trace passing through squares and designated by reference numeral 44 was generated by injecting the HC pulses four seconds in advance of the time the NOx transient spikes were caused to occur. FIG. 4 shows that over the entire window temperature range of the reducing catalytic converter, injecting HC pulses at or prior to the time the NOx, transient emissions occur, result in significant conversions of NOx. It should again be noted that the catalyst was acidic for these tests.

Figure 7:
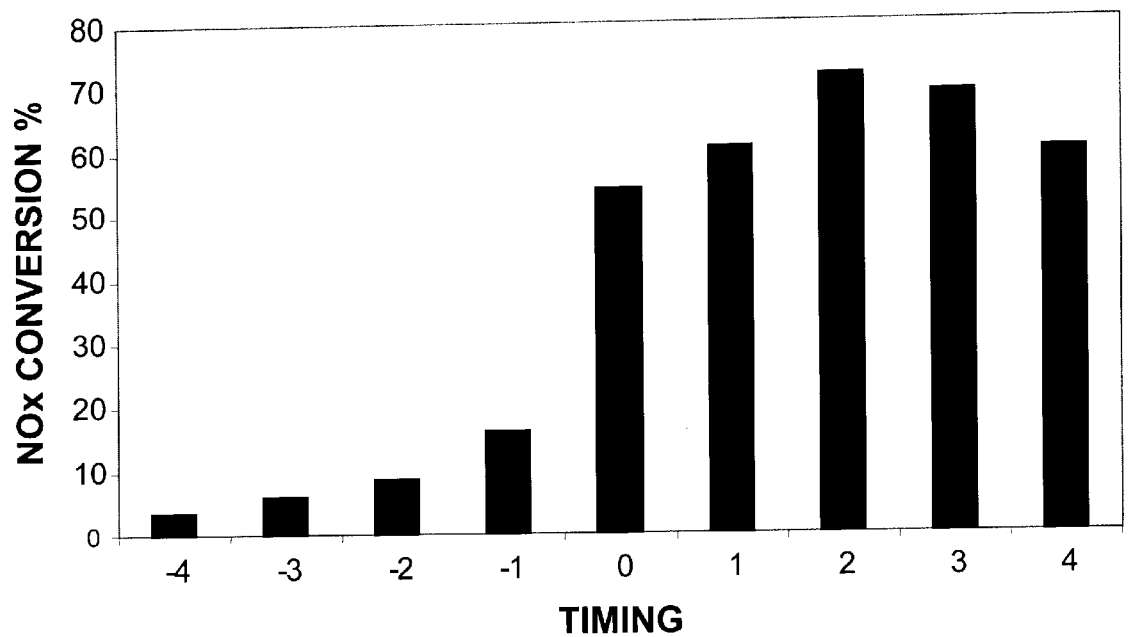
FIG. 7 is a bar graph showing average NOx conversion percentages for various times at which pulses of HC concentrations are introduced into the catalytic converter relative to the time at which pulses of NOx concentrations are introduced into the catalytic converter.

Referring now to FIG. 7, there is shown in bar chart form the average conversion of NOx at 250° C. when HC pulses or spikes of hydrocarbon are caused to occur in timed relationship to the NOx transient emissions. When the HC pulses are retarded or occur after the NOx transient spikes occur (designated by −1, −2, −3 and −4 second increments on the x-axis) conversion of the NOx transient emission does not significantly occur. When the HC transients are caused to occur simultaneously or in advance of the time of the NOx transients (indicated by the 0, 1, 2, 3 and 4 second increments on the x-axis) there is a dramatic increase in the average overall conversion of the NOx transient emission.

While the invention is not necessarily limited to any specific theory accounting for the observations illustrated in FIGS. 4–7, there are two plausible explanations which can be viewed as consistent with one another.

The first explanation may perhaps be best explained by reference to FIG. 8 which shows schematically one of a plurality of channels 50 making up a honeycomb catalytic converter. Channel 50 is formed of a substrate 51 which is a metal or cordierite monolith upon which a washcoat 52 containing a catalyst and other substances is deposited. The channel defines a relatively long, somewhat narrow passage having an inlet 53 and an outlet 54.

Assume that a pulse of HC designated by reference numeral 56 and a pulse of NOx designated by reference numeral 57 are simultaneously injected at inlet 53 at the same time $T_0$. An analogy is drawn to capillary gas chromatography theory in that the washcoat 52 (the coated walls of the monolith) can by hypothesized to be analogous to the adsorptive properties of the stationary phase of a gas chromatography column. Gas chromatography theory states that any short gas pulse or transient will be broadened and delayed as the gas pulse interacts (i.e., adsorbs and desorbs) with the coated walls or washcoat 52. Furthermore, each gas component will interact differently as a function of the temperature of the gas and the chemical characteristics of the gas component. Because HC and NOx interact differently with any washcoat, there will be a tendency for these gas components to separate spatially as they travel down the length of passage 50. This is diagrammatically represented by the HC pulse within channel 50 designated by reference numeral 56' at time $T_1$ and NOx pulse in channel 50 designated by reference numeral 57' at time $T_1$. Each pulse is broadened and extends between the time intervals T1' and T1", although the breadth of the pulse is not necessarily the same for each. Each pulse is delayed as indicated by the relative positions of HC pulse 56' and NOx pulse 57'. In order to react HC and NOx within channel 50, they must be present at the same place and time within channel 50 and at a temperature where the selective reduction reaction can favorably occur. Thus, in order that maximum overlap of HC and NOx occurs down the length of channel 50, it may be necessary that the HC and NOx elements impact the front face or inlet 53 of channel 50 at different times. More specifically, if the catalyst washcoat 52 has a function which adsorbs HC, then it will be beneficial to have the HC impact the catalyst prior to the NOx. On the other hand, if the catalyst has a function which adsorbs NOx, then it may be beneficial to have the NOx impact the catalyst prior to the HC. Furthermore, and as will be discussed with respect to the second explanation, if a pretreatment of one component is required in a slow reaction step, then it will be important to have that component which is pretreated impact the front face of the catalyst first. More particularly, if washcoat 52 has an acidic function (pH less than 6) which reacts with the HC (to form an oxygenated or partially cracked reactive species) then it will be beneficial to have the HC impact the catalyst prior to NOx. In the examples discussed above, the zeolite based reducing catalyst is highly acidic and will crack or partially crack the HC thus delaying the reaction. On the other hand, if the washcoat has a basic function (pH greater than 8) which reacts with NOx (to form an adsorbed nitrite/nitrate such as barium nitrate from barium present in washcoat 52) or performs a catalyst function that oxidizes NO to $NO_2$, then it may be beneficial to have the NOx impact the catalyst prior to the time the HC contacts the catalyst.

In accordance with another explanation of how the transient reactions described above occur, and which is somewhat consistent with the first explanation, is that the fuel oil or diesel fuel, when cracked at the appropriate temperature within channel 53, will produce activated carbon. The activated carbon resulting from the cracking of the fuel will react with the oxygen in the NOx to reduce the NOx. The activated carbon will also react with the oxygen in the exhaust gas. Thus, the injection of the fuel oil into the exhaust gas has to take into account the time for the fuel to be cracked so that activated carbon is produced or deposited at the time the NOx transient comes into contact with HC. Studies conducted by the assignee of the present invention have determined that when fuel oil, which by definition includes a majority of molecules having more than 10 atoms per molecule in a liquid phase, is cracked or partially cracked to produce unsaturated or oxygenated long chain hydrocarbons, the carbons in the long chain hydrocarbons are active in the reduction of NOx. As is well known, cracking of the fuel oil is a function of the gas temperature, time and the catalyst and proceeds in accordance with the radial chain theory splitting off short chain molecules from longer chain molecules.

In the preferred embodiment, it is contemplated that diesel fuel (preferably fuel oil No. 2) will be pulsed in liquid form through any number of conventional arrangements to provide the reductant for the NOx conversion. Cracking will occur, if not earlier, in the reducing catalyst producing specific HC compounds formed as a function of the temperature of the exhaust gases (and space velocity). Certain HC long chain hydrocarbons will be produced having a beneficial reduction effect. However, the invention will function if the fuel oil is cracked outside the exhaust system to produce desirable HC reductants and the HC reductant pulse metered as a reducing gas at the inlet of the reducing converter. Studies conducted by the assignee have shown that normal or unbranched aliphatic HCs are very good reductants as long as the chain length is greater than C7, i.e., the organic molecules have more than 7 carbon atoms. For example, decane and dodecane are shown to be excellent reductants while propane (three carbon chain), ethane and methane are not. Olefins are believed good reductants, regardless of chain length. Propylene has been one of the key HC reductants somewhat universally reported in studies and in literature and is demonstrated as a good reductant. Aldehydes and ketones also exhibit good reducing properties. In contrast, branched aliphatic HCs are poor reductants. Aromatic HCs are better reductants than branched aliphatics but are not the best HC reductants. In general, good HC reductants include normal, unbranched aliphatics having a chain length where the number of carbon atoms per molecule is equal to or greater than 7 and olefins, of any size. If selectivity is possible, such as would occur if the vehicle was equipped with a cracking catalyst, branched aliphatics and aromatic HC reductants should be minimized.

Figure 9:
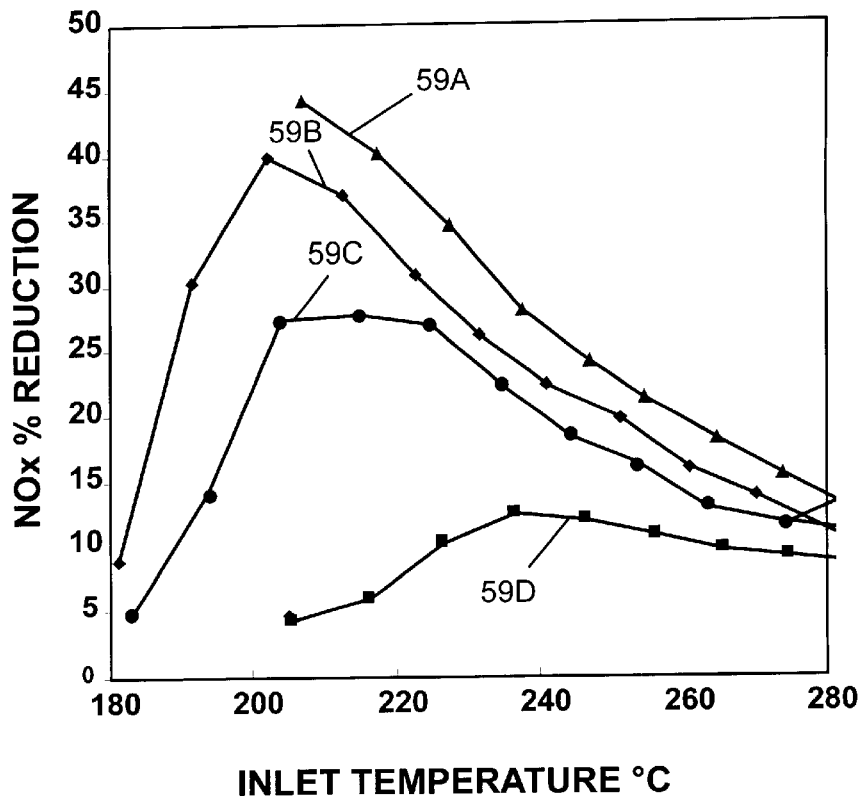
FIG. 9 is a graph showing NOx conversion percentages for various long chain HCs at various temperatures.

Referring now to FIG. 9, there is graphed NOx reduction percentages at various exhaust gas temperatures at the catalyst inlet for certain long chain hydrocarbons. More particularly, n-Hexadecane (C16) is shown by trace designated by reference numeral 59A passing through triangles; n-Dodecane (C12) is shown by trace designated by reference numeral 59B passing through diamonds; n-Decane (C10) is shown by trace designated by reference numeral 59C passing through circles and n-Heptane (C7) is shown by trace designated by reference numeral 59D passing through squares. Consistent with the previous discussion, FIG. 9 shows the desirability of long chain HC's as the reducing reagent for NOx reduction.

The reducing catalytic converter is a de-nox catalyst or an active lean catalyst. Currently, lean-NOx catalysts are of two types: 1) low temperature lean-NOx catalysts which are platinum based (Pt-based) and 2) high temperature lean-NOx which have base metal/zeolite compositions, for example, CU/ZSM-5. The Pt in the low temperature type 1 catalyst is best atomically dispersed and would produce an amorphous and not crystalline structure. The Pt catalyst does not have to have the zeolite present to be active but Pt/zeolite catalyst are better and appear to have better selectivity against formation of $N_2O$ as a byproduct than other catalysts, i.e., Pt/alumina. Zeolite alone (e.g., HZSM-5) has some activity for NOx reduction but is not as good a lean-NOx catalyst. When exchanged with copper, it constitutes an active catalyst for high temperature NOx reduction.

The preferred reducing catalyst for use in this invention are composites of zeolites with base metals or platinum (i.e., precious metals group). The zeolites within the preferred group can be any of the conventional acidic, hydrothermally stabilized zeolites but preferred, as noted above, is ZSM-5. While the metal may or may not be crystalline, the zeolites have a crystalline structure exhibiting porosity. Reference can be had to assignee's U.S. Pat. Nos. 4,961,917 and 5,516,497, incorporated by reference herein. The crystalline structures of zeolites exhibits a complex pore structure having more or less recurring connections, intersections, and the like in dimensional planes. Preferred zeolites for use in the reducing catalysts are those which have relatively large diameter pores interconnected within all three crystallographic dimensions, typically about 5–6 Angstroms. However, the invention will function with any zeolite catalyst bed having a porosity of 2–3 Angstroms to about 8–10 Angstroms. It is to be noted that some of the preferred HC have longer chain components of a size which will not permeate the preferred zeolite bed. Nevertheless, the longer chain aliphatics are preferred since improved reactivity results from the activated carbon resulting from these compounds.

Figure 10:
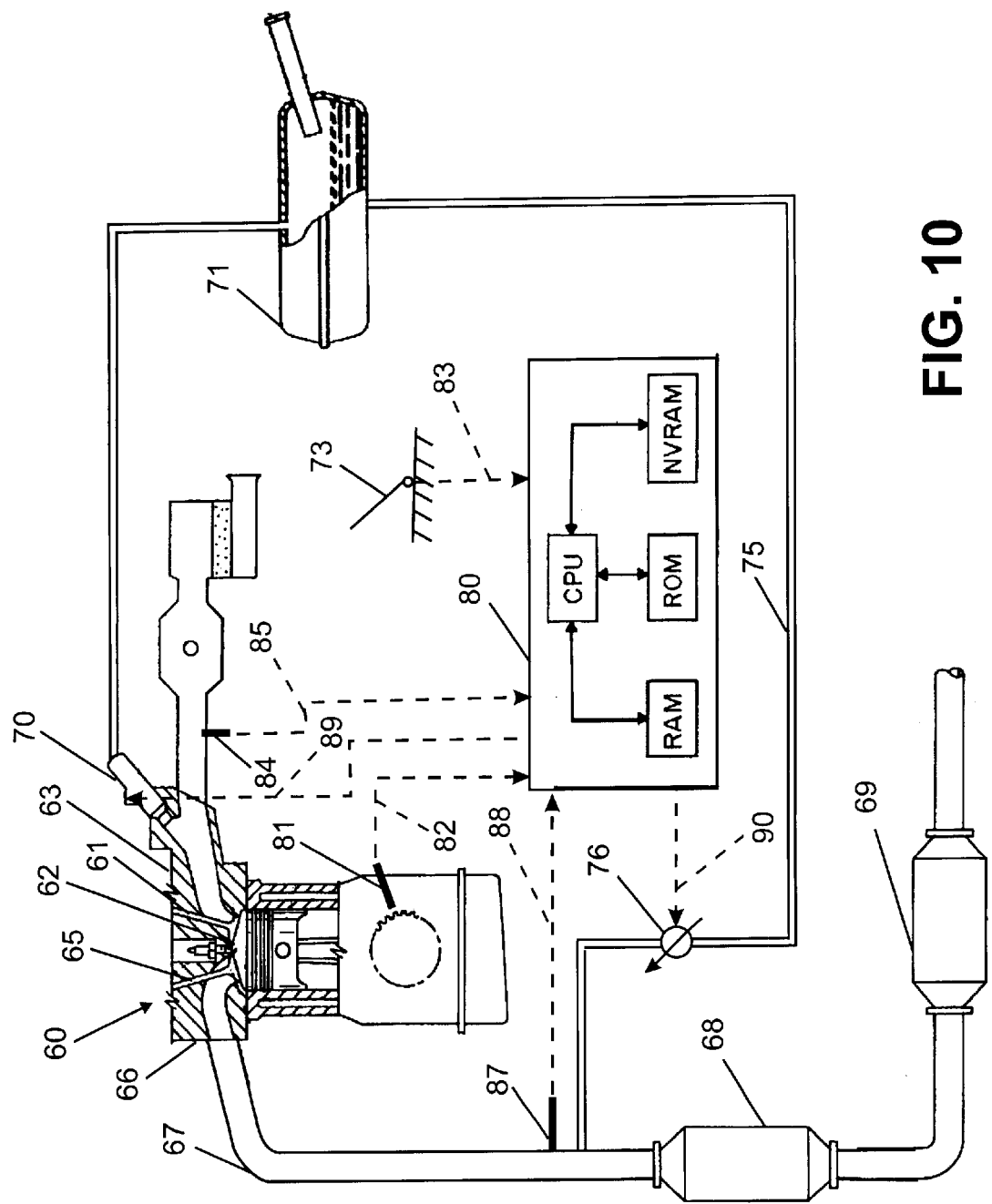
FIG. 10 is a schematic representation of some of the control components used in the system of the present invention.

Referring now to FIG. 10 there is schematically shown a general arrangement of the principle system components used to control NOx transient emissions produced by a diesel engine 60. An intake valve 61 controls admission of a fuel/air mixture to the engine's combustion chamber 62 from an intake manifold 63. An exhaust valve 65 controls the emission of exhaust gases produced in combustion chamber 62 to an exhaust manifold 66, in turn, connected to an exhaust pipe 67. Attached to exhaust pipe is a reducing or de-nox catalytic converter 68 followed by an oxidation catalyst 69. Oxidation catalyst 69 is optional in that its function can be included or built into reducing catalytic converter 68. Oxidation catalyst 69 is conventional. It is a base metal oxide such as an oxide of copper, cobalt, chromium, cerium, etc. or a noble metal catalyst containing palladium or platinum supported on $Al_2O_3$, $TiO_2$, CeO, etc.

A fuel injector 70 receives pressurized diesel fuel from fuel tank 71 for pulse metering of the fuel into intake manifold 63. A fuel demand command controlled by the vehicle's operator through an accelerator or fuel demand pedal 73 controls fueling and consequently the speed/load of the vehicle.

In the embodiment shown in FIG. 10, a separate hydrocarbon feed line 75 connected to fuel tank 71 is provided for admitting diesel fuel in front of reducing catalytic converter 68. Within HC feed lines 75 is a metering valve 76, i.e., solenoid valve, controlling admission of fuel oil to exhaust pipe 67. This is an optional arrangement and is illustrated because it would be the arrangement used if a separate fuel oil cracking unit (not shown) would be employed in the invention. In such instance, the fuel oil would be cracked into desired hydrocarbon chain lengths and pulsed metered to the inlet of reducing catalytic converter 68 by metering valve 76. In the preferred embodiment, a common rail fuel injector 70 would be operated in the conventional known manner to inject an additional quantity of diesel fuel into combustion chamber 62 in excess of that required by the set A/F ratio to produce HC for reducing purposes. The additional fuel is typically injected after TDC (top dead center) during the expansion stroke of the engine cycle. The exhaust gases, i.e., products of combustion, evaporate the fuel oil which eventually crack in reducing catalytic converter 68 producing at least some quantity of activated carbon required for reduction. Still alternatively, a known design could be employed where an additional fuel injector is used to inject additional quantities of diesel fuel on demand to any cylinder of diesel engine 60.

The operation of engine 60 is under the control of an ECU (engine control unit) 80. ECU is a microprocessor based control system containing a conventional CPU with RAM, nonvolatile RAM, ROM, look-up tables for engine mapping purposes, etc. ECU 80 receives input sensor signal information, processes the data by programed routines and generates actuator output signals. While a dedicated processor could be supplied to control the transient HC metering system of the present invention, because the input sensor data, for the most part, is now utilized by ECU 80 to control engine 60, it is preferable that ECU 80 likewise control the HC metering system.

Typical sensor input signals that can be utilized by the present invention include a speed/load signal from a speed/load pickup 81 (i.e., a speed sensor and a torque sensor such as used in the engine's transmission) on speed/load sensor line 82, a fuel demand input signal from fuel demand pedal 73 on fuel demand input signal line 83, a mass flow signal generated from a pressure or flow sensor 84 on a mass flow sensor line 85 and an exhaust gas temperature shown sensed by a temperature probe 87 at the inlet of reducing catalytic converter 68 inputted on exhaust gas sensing line 88. All sensors currently exist so that additional hardware, with the possible exception of modifying the fuel demand pedal, do not have to be employed. Again, the sensors noted are merely for illustration purposes. For example, mass flow sensor 84 is utilized by ECU to not only generate a pulsed fuel signal on an injector actuator line 89 but is also used in connection with other signals to determine space velocity of exhaust gases. The invention needs to determine an impending engine speed command signal inputted by the vehicle's operator, the current speed/load condition of the engine, the space velocity and temperature of the exhaust gas. These conditions can be directly sensed as shown or, as is known in the art, be generated or modeled from other sensor signals through mathematical routines stored in ECU 80. For example, it is known that the exhaust gas temperature (or an approximation thereof) can be calculated from other sensors on the vehicle such as a sensor measuring the ambient temperature and a sensor measuring the engine's coolant temperature which, in combination with other data input, allows ECU 80 to model the exhaust gas temperature. It is to be understood that all such known arrangements for sensing and/or modeling the input operating parameters of engine 60 are included within the scope of this invention.

ECU 80 receives the input sensor signals, performs programmed routines and generates a pulsed metering signal on pulse signal line 90 to metering valve 76, or alternatively, as already explained, on injector actuator line 89 to injector 70 or to a common rail injector (not shown). The current state of the art generates a map of steady state engine operating conditions for each engine and for each catalytic converter system mated to that engine, and stores the map in a look up table in ECU 80. The map is accessed at current engine operating conditions determined by the sensors and ECU 80 performs a first routine which determines the NOx emissions, the HC emissions and oxygen produced at that operating condition, and calculates an HC reductant quantity to be pulse metered through metering valve 76 to reducing catalytic converter 68. When determining the HC reductant quantity the temperature of the catalyst and the space velocity of the exhaust gases through the catalyst are also considered. This is at steady state or constant speed/load engine operating conditions. Reference can be had to U.S. Pat. No. 5,522,218 for a more detailed description of the mechanics than that presented herein.

Figure 11:
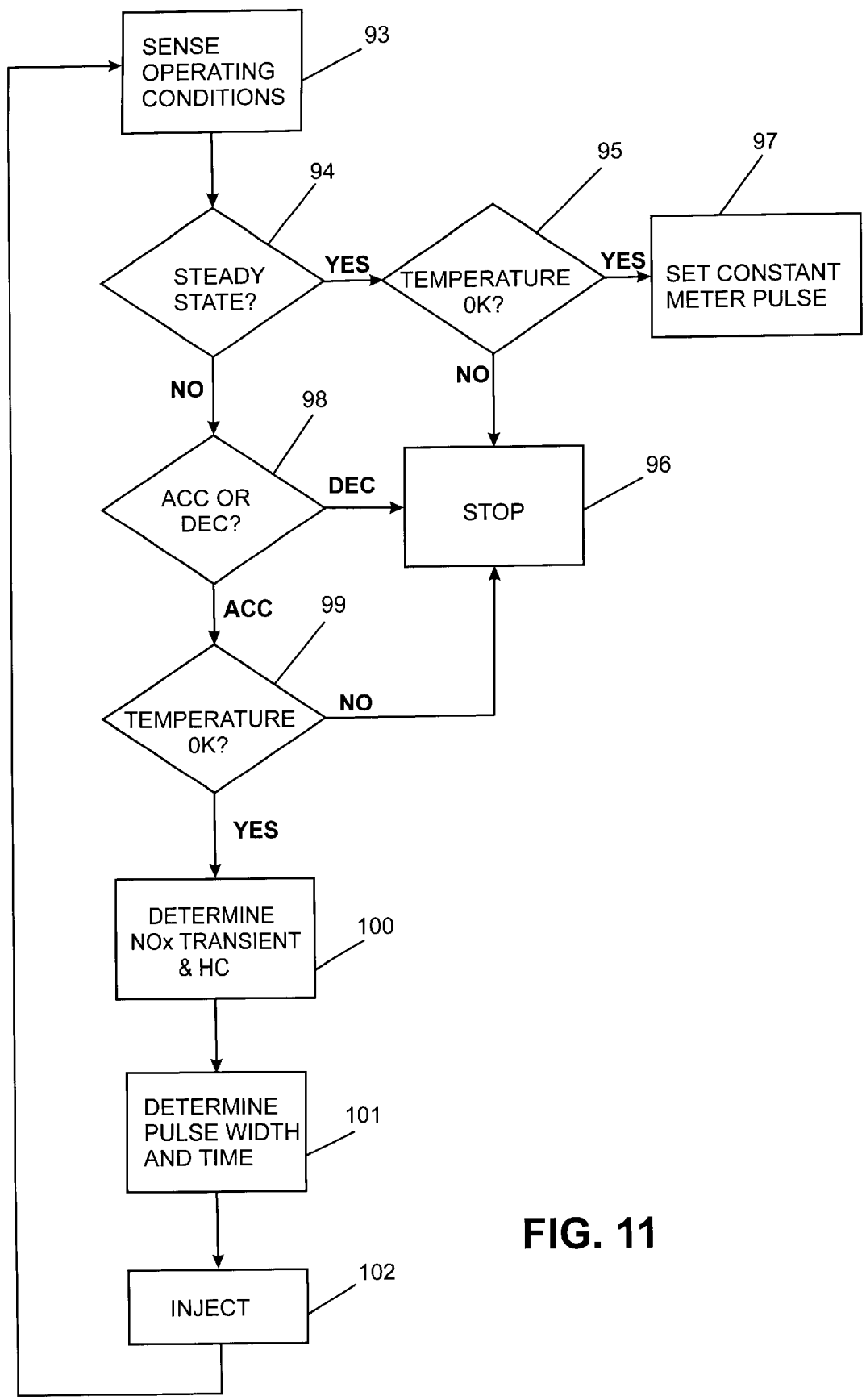
FIG. 11 is a flow chart of the process employed in the system of the present invention; and, FIG. 12 is a pictorial, prior art representation of a preferred type monolith which can be used in the present invention.

Referring now to FIG. 11, there is shown, generally, a flow process chart used by the system of the present invention. The operating parameters of engine 60 are monitored by sensors, as described with reference to FIG. 10, at block 93.

As discussed above, the preferred embodiment utilizes a fuel demand sensor input signal to make systemic decisions although other sensors could be used in addition or in lieu of the fuel demand pedal such as a clutch position sensor, or to a lesser extent, transmission sensor. Preferably, the fuel demand pedal sensor senses not only the absolute position of the throttle (which is conventional) but it also senses the position at short periodic intervals so that rate of change signals can be ascertained within very short time periods. Thus, the pedal sensor may have to be modified so that a timing circuit or clock signal can be associated with its position signal. Manufacturers currently build into the fuel demand pedal a fractional second delay for driver convenience (response) and there is an inherent response latency within the engine before the engine is actually operating at the commanded fuel demand input. It is appreciated that when the engine is accelerating NOx transients are being produced. Nevertheless, the delay times are sufficient to enable utilization of conventional feed forward control techniques to generate an advance fuel demand signal. Preferably, the rate of change of the fuel demand signal i.e., signal magnitude, is then applied to an empirically developed acceleration curve which is exponential. The curve is read at the sensed acceleration to extrapolate a factor which multiplies the current steady state HC addition to arrive at a transient fed forward to metering valve 76. Alternatively, a separate acceleration map can be generated to arrive at a factor applied to the steady state concentration of the HC reductant. Acceleration map will then account for additional HC generated during the transient, etc. A still further alternative is simply to calculate the rate of change of the pedal position as a linear slope to produce a factored number for varying the, amount of HC reductant which is currently being fed to the system.

Referring still to FIG. 11, if the fuel demand pedal indicates that engine 60 is in a steady state condition as at decision block 94, the system then determines the temperature of the exhaust gas, i.e., temperature probe 87, to ascertain whether or not the exhaust temperature is within the operating temperature window of reducing catalytic converter 68 at decision block 95. This is the temperature range of trace 18 discussed with reference to FIG. 2. If exhaust gas temperature is outside the window, metering valve 76 is shut off at stop block 96. If exhaust gas temperatures are within the catalytic converter temperature operating window, the steady state map previously discussed is interpolated to set a constant metered pulse at constant pulse block 97 as conventionally done in the prior art. As noted, this value is determined from the speed/load of the engine and the intake air flow (i.e., space velocity, temperature being previously sensed in block 94). From these operating engine parameters it is possible to determine the concentration of NOx emissions, HC emissions, and oxygen, all of which are considered in determining a fixed quantity of HC to be periodically metered through metering valve 76 either continuously or through periodic pulses of HC.

If the fuel demand pedal is detecting a rate of change, then the rate of change is determined to cause an acceleration or deceleration of engine 60 in rate of change block 98. If a deceleration is detected, metering valve 76 is shut off at stop block 96. If an acceleration is detected, the temperature of reducing catalyst 68 is checked to see if it is within the transient temperature window at decision block 99. This is trace 19 discussed with reference to FIG. 2. If outside, the system shuts off metering at stop block 96 to prevent the oxidation catalyst from being flooded with excess HC. If within the temperature window, then the NOx transient and the additional quantity of HC which must be supplied to match the transient is determined by using any of the techniques, discussed above in NOx transient block 100. The time of injection is determined at time block 101 and the injection occurs at block 102. Conceptually, the time duration of the pulsed HC injection, i.e., the pulse width, will be equal to the time at which the transient emission is produced, i.e., the acceleration time. In practice, the HC pulse will be made up of a series of short duration pulses correlated to some number of rate-of-change signals detected while throttle peddle is being depressed. The time duration of each HC pulse may be constant. In such instance, the height or amplitude of each pulse will equal the set quantity of HC determined by the acceleration map for the sum of the HC pulses to make up the transient amount of HC to be supplied. In this way, if the operator should vary the acceleration, the system will somewhat account for the variation in the NOx transient. Other engine operating conditions (block 93) which can lower engine out NOx such as EGR or VGT or a driving event like a deceleration, can stop HC injection.

It is or should be appreciated that load changes on the engine without speed change, such as when the vehicle travels up a hill, are accompanied with a pedal depression and thus picked up as an acceleration change in rate of change block 98.

Figure 8:
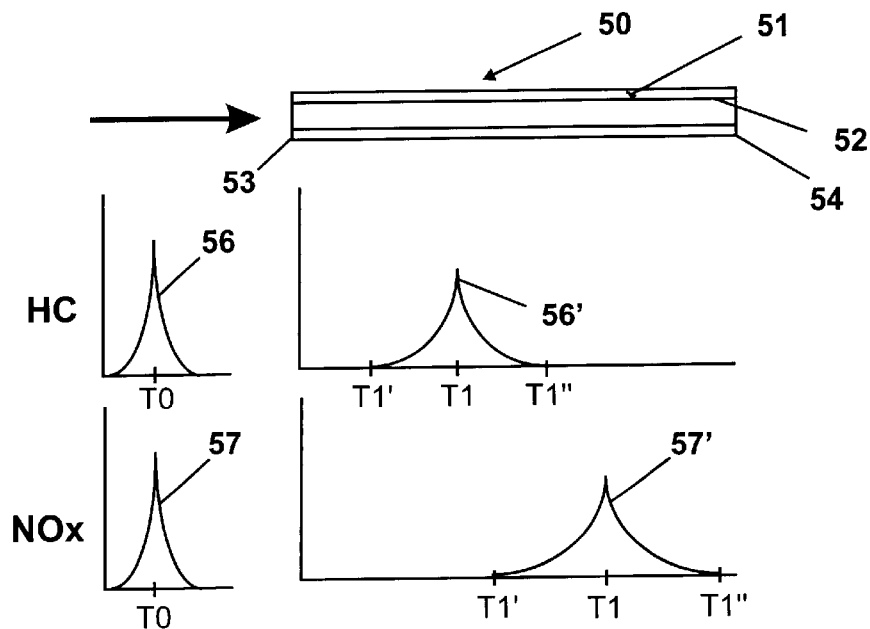
FIG. 8 is a schematic representation of an HC and NOx pulse traveling in a monolith channel of the catalytic converter.

As noted, with respect to the discussion of the washcoat composition of the catalyst with reference to FIG. 8, it is possible to delay the NOx pulse if the washcoat is alkaline or basic tending to promote the formation of nitrites or nitrates, i.e., barium nitride or copper nitride, etc., which, in turn, will delay the passage of the NOx transient as it travels through passage 50 and adsorbs and desorbs relative to the washcoat. Also, from the discussion noted above, there is a delay attributed to further cracking of the evaporated diesel fuel within reducing catalytic converter 68. Finally, it is noted that ideally, for an acidic washcoat, an HC injection of about 2 seconds prior to the NOx transient will produce ideal conversions. As a practical matter, an advance timing of 2 seconds from the time the operator decides to accelerate the vehicle to the time that the vehicle engine is commencing acceleration (at which time the NOx transients are being produced)is likely not possible. In this respect, FIG. 7 shows that if the HC transient can be injected simultaneously with the NOx transient at the front face of reducing catalytic converter 68, a significant conversion of the NOx transient is possible. This is entirely feasible especially with injection through the injector 70.

It is important to recognize that a NOx sensor does not obsolete the invention and could be used in a system incorporating the invention. As discussed in the Background, currently a NOx sensor does not commercially exist that can give the fast response times needed in vehicle emission control systems. Assume for discussion purposes that a fast NOx sensor did exist and the NOx sensor was mounted upstream of the catalyst. The space velocity of the exhaust gas is such that at the time the NOx sensor would detect the NOx transient emission, the NOx transient emission would be through the catalyst. The fuel demand pedal or some other advanced recognition sensor must be used to allow feed forwarding of the HC injection signal.

It is possible to "tweak" the performance of reducing catalyst 68 by its construction and formulation to impose a delay time on the reactants such as to cause the reactants to be spatially coincident within passage 50 at the same time allowing a reduction of the transient reactants. With respect to converter construction, passages S0 should be made in as small a cross-sectional area as possible without producing adverse back pressures on the engine. An L/D ratio of about 20 to about 200 is acceptable. While a ceramic monolith can be constructed within the L/D ratio range, metal monoliths can also be constructed with relatively long L/D ratios. The object is to formulate passages 50 so as to assimilate a capillary tube.

With respect to the composition, it is preferred that alkaline elements be added to the washcoat or to at least portions of the washcoat, to delay the NOx transient. The alkaline composition optimally include alkali, or alkaline earth or rare earth metal oxides or carbonates. The NOx "delay" is to try and match the "delay" attributed to HC cracking to produce desired HC reductant chains. The effect of an optimal washcoat composition is expected to reduce the optimum advance conversion time from the observed 2 seconds discussed with reference to the graphs above to as early as ½ second or so which is clearly within the time of the feed forward techniques discussed above. When adding alkaline components, it is necessary to avoid NOx release phenomena as reported in the '857 patent.

It is potentially possible to have an HC breakthrough or slip which will exceed the HC emission requirements set in the test drive cycles. Test results have indicated that if channel 50 was formed to provide a tortuous path such as by bends or zigzags in the channel, HC breakthrough or slip is not likely to occur. An example of a tortuous channel path is illustrated in a prior art honeycomb catalytic converter shown in FIG. 12. Preferably, the tortuous path channels are defined by offset longitudinally extending sections (in the x and y directions) such as indicated by reference numerals 110 and 111 in FIG. 12. Change in direction of gas flow increases the likelihood of HC oxidation as well as enhancing reduction reaction with NOx. More particularly, the channel configuration should be such that turbulent flow can be created within channels 50 without producing adverse backpressure to produce NOx and HC contact for the desired NOx reduction reactions to occur. Laminar flow and its associated boundary layers, to the extent possible, is to be avoided or reduced. Finally, it is preferred to have a tortuous path monolith in the oxidation catalyst 69 as well as in the de-nox catalyst 68 for even further improvement in the area of HC slip.

Figure 12:
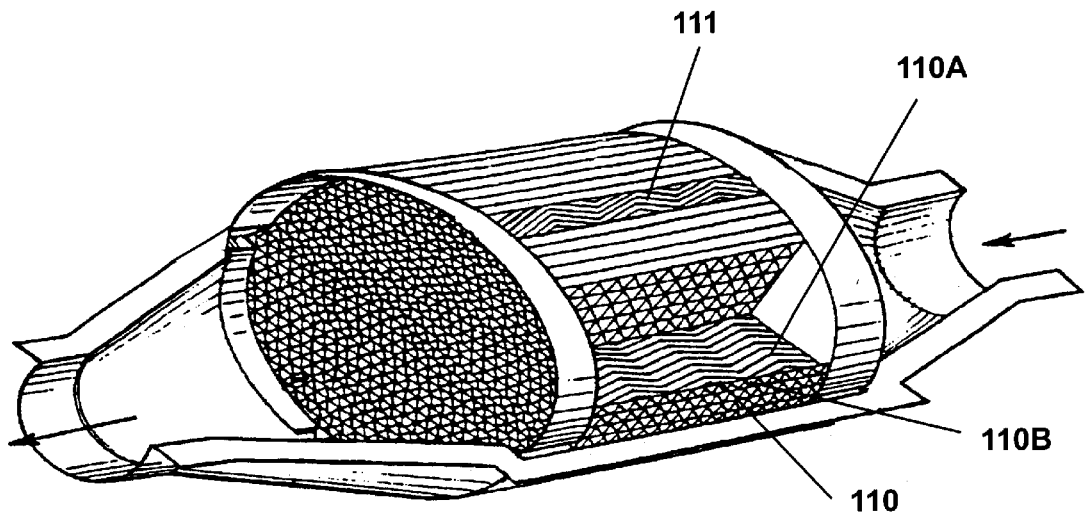

The preferred arrangement for de-nox catalyst 68 is to provide zones in each channel 50 having alkaline or acidic composition. For example, as shown in FIG. 12, an alkaline washcoat can be provided at a channel zone 110A followed by an acidic washcoat at adjacent channel zone 110B and the pattern repeated through the zig-zag length of the channel. The alkaline and acidic concentrations in each zone can progressively vary from inlet to outlet. To some extent, the tortuous path displaces the relative position of the HC and NOx gas streams as the gas streams travel the length of the channel so that certain portion of the gas streams may contact various zones in the channel tending to hold or momentarily adsorb one of the gases. The likelihood that the HC and NOx gases contact one another at some point along the channel length to produce the desired NOx reduction reaction increases.

As noted in the Background and as discussed in assignee's United States '155 patent incorporated by reference herein, zeolite based trap catalysts are conventionally used to trap and store HC emissions during warm-up of the engine. The trap catalyst is usually configured as extending over a portion of de-nox catalyst 68. When exhaust temperature exceeds about 200° C. the HC is desorbed and since an excessive amount of HC is present, a rather fast catalyst temperature rise in the catalyst will occur. This phenomena similar to TWC "light-off" is a following event. The HC has desorbed and passed through reducing catalyst 68 by the time the catalyst experiences its temperature rise. The temperature rise produces an NOx transient which is significant and which occurs, as noted, after the trapped HC has been released. The active lean-NOx invention disclosed herein can sense the inevitable temperature rise at catalyst light-off and meter HC to avoid the NOx release transient (as opposed to a transient delivered from the engine). In this instance, the NOx transient is not caused by the acceleration of the engine but by the rapid temperature rise. There are temperature modeling techniques which can be implemented in the ECU which can predict when the temperature rise will occur. For purposes of understanding the invention, a temperature sensor at catalyst outlet can predict when the catalyst temperature reaches 200° C. (or some other temperature) where NOx transients are formed. The HC injection can then be timed to occur at or slightly before the NOx transient is formed as was done with the acceleration embodiment discussed above.

The invention has been described with reference to diesel engines for which it is particularly suited. Conceptually, the invention is not limited to diesel engines and may have application to vehicles powered by gasoline engines operated lean or with "lean burn" engine fueling strategy. For definitional purposes a "lean" engine as used herein and in the claims is an engine that operates at an air-to-fuel (A/F) ratio such that the nitrogen oxide emissions cannot be continuously treated by conventional three-way catalysts (TWC). Conventional TWCs are able to treat gasoline powered engines using fueling strategies that cycle lambda (A/F necessary to produce stoichiometric combustion) at lean conditions as high as 1.03. Again, although diesel engines operate at significantly higher A/F ratios than "lean burn" gasoline engines, the invention can nevertheless function with lean burn engines. In such instance, the infrastructure of the vehicle would have to change to include a tank for fuel oil or diesel fuel. An external injector arrangement such as shown in FIG. 10, would have to be utilized and the engine operating parameters that are measured to determine NOx would also have to be expanded to account for the A/F ratio used, not only during steady state, but also during the time NOx transients occur. With these additional changes, the invention will function in the manner described above.

The invention has been described with reference to a preferred embodiment. Obviously, alterations and modifications will become apparent to those skilled in the art upon reading and understand the Detailed Description set forth herein. It is intended to include all such modifications and alterations insofar as they come within the scope of the present invention.

What is claimed is:

1. In a method for reducing NOx emissions produced by a vehicle powered by a diesel engine having a de-nox reducing catalyst with an acidic washcoat through which the exhaust gases pass, said vehicle having sensors for determining NOx concentrations at steady state engine operating conditions, and a hydrocarbon trap catalyst or the de-nox catalyst has a hydrocarbon trap catalyst portion upstream of the de-nox catalyst, the improvement comprising the steps of:

a) with the engine at normal operating temperatures, sensing a fuel demand pedal sensor signal to determine an impending acceleration of the vehicle, said acceleration producing a transient emission pulse containing NOx with said engine operating with a lean fuel/air mixture, said transient emission pulse rapidly passing through the exhaust system of the vehicle at the speed of the exhaust-gases;

b) pulsing a set quantity of diesel fuel reductant into the exhaust gases of the engine prior to the time the engine produces said transient emission;

c) causing said fuel oil to produce reductants by reactions within said catalyst which are still present in said catalyst when said transient NOx emission pulse enters said catalyst at a concentration sufficient to substantially react with said transient NOx emission pulse as said reductants and said NOx transient emission pulse pass through said catalyst, and during engine warm-up;

d) detecting a rise in the temperature of the hydrocarbon and/or de-nox catalyst during warm-up of the vehicle; and, e) injecting a quantity of diesel fuel sufficient to react with NOx transient emissions caused by the temperature rise prior to the time the temperature rise produces a NOx transient emission from said hydrocarbon trap catalyst resulting from desorbtion of the HC during engine warm-up.

2. The method of claim 1 further including the step of stopping injection of the diesel fuel reductant when the engine is decelerating.

3. The method of claim 2 further including the step of injecting the diesel fuel reductant at a set rate when the temperature of the de-nox catalyst is within a first temperature range and the engine is operating at steady-state conditions and injecting the diesel fuel at a variable rate when the temperature of the de-nox catalyst is within a second broader temperate range and the engine is accelerating.

4. The method of claim 3 further including the step of causing the exhaust gases including the diesel fuel to traverse tortuous paths defined by specially configured zig-zag channels formed in the de-nox catalyst.

5. The method of claim 4 further including the step of causing the exhaust gases with the diesel fuel in the form of hydrocarbons to travel through different acidic and alkaline zones formed in the catalyst channels.

6. The method of claim 5 further including the step of passing the exhaust gases through an oxidation catalyst or oxidation catalyst portion of the de-nox catalyst downstream of the de-nox catalyst, the exhaust gases traversing tortuous paths defined by specially configured zig-zag channels formed in the oxidation catalyst or oxidation catalyst portion.

7. The method of claim 1 further including the step of substantially cracking the fuel oil before the fuel oil enters the inlet of the de-nox catalyst.

8. The method of claim 1 wherein said diesel fuel is injected about two seconds before said transient emission is produced by said engine.

9. In a method for reducing NOx emissions produced by a vehicle powered by a diesel engine having a de-nox reducing catalyst with an acidic washcoat which does not substantially store NOx and through which the exhaust gases pass so that reduction of NOx occurs by reacting a fuel reductant with the NOx over the catalyst bed, and a separate hydrocarbon trap catalyst immediately upstream of and in direct fluid communication with the de-nox catalyst or the de-nox catalyst having a hydrocarbon trap catalyst portion upstream of the de-nox catalyst, the method comprising the steps of;

a) during a portion of the time the engine is warming up and prior to the time the engine reaches operating temperature, absorbing hydrocarbons in said hydrocarbon trap catalyst and thereafter, as said engine continues to warm up, desorbing the hydrocarbons from said hydrocarbon trap catalyst to cause an increase in temperature of said de-nox catalyst and said de-nox catalyst, at a set temperature of about 200° C. achieved during warm-up, producing a transient pulse of NOx;

b) measuring the temperature of one of the exhaust gas, hydrocarbon trap catalyst and de-nox catalyst to determine the temperature of the de-nox catalyst during engine warm-up;

c) detecting a set rise in the measured temperature during warm-up of the engine prior to the time said de-nox catalyst produces said transient pulse of NOx; and, d) Injecting a pulse of diesel fuel of a quantity that is matched with and sufficient to reducingly react with said pulse of NOx transient emission in said de-nox catalyst, said fuel pulse injected as a function of said set rise in temperature to occur at a time prior to and not later than the time that said transient pulse of NOx Is produced so that both diesel fuel reductant and NOx transient pulses exist simultaneously in said de-nox catalyst.

* * * * *